US006534144B1

(12) United States Patent
Bando et al.

(10) Patent No.: US 6,534,144 B1
(45) Date of Patent: Mar. 18, 2003

(54) SYNTHETIC RESIN FILM COVERED HEAT INSULATING/SOUND ABSORBING MATERIAL OF INORGANIC FIBERS AND A METHOD OF PRODUCING THE SAME

(75) Inventors: Takashi Bando, Tokyo (JP); Masataka Yasu, Tokyo (JP); Kiichi Yamatsuta, Tokyo (JP)

(73) Assignee: Asahi Fiber Glass Company Limited, Tokyo (JP)

( * ) Notice: Subject to any disclaimer, the term of this patent is extended or adjusted under 35 U.S.C. 154(b) by 600 days.

(21) Appl. No.: 08/936,724

(22) Filed: Sep. 25, 1997

(30) Foreign Application Priority Data

Sep. 27, 1996 (JP) ............................................... 8-277245

(51) Int. Cl.[7] .......................... B32B 17/00; B32B 31/06
(52) U.S. Cl. ........................ 428/74; 428/76; 156/291; 156/292; 156/62.2
(58) Field of Search .............................. 156/62.2, 290, 156/291, 292; 428/71, 74, 76

(56) References Cited

U.S. PATENT DOCUMENTS

| 1,336,403 A | * | 4/1920 | Weiss |
| 2,435,347 A | * | 2/1948 | Gilman |
| 3,369,547 A | * | 2/1968 | Sack et al. |
| 3,546,846 A | * | 12/1970 | Sens |
| 4,436,204 A | * | 3/1984 | Sowinski |
| 5,318,644 A | * | 6/1994 | McBride et al. ........... 156/62.2 |
| 5,362,539 A | * | 11/1994 | Hall et al. |
| 5,545,279 A | * | 8/1996 | Hall et al. |

FOREIGN PATENT DOCUMENTS

JP           04-257226       * 3/1994

* cited by examiner

Primary Examiner—Sam Chuan Yao
(74) Attorney, Agent, or Firm—Oblon, Spivak, McClelland, Maier & Neustadt, P.C.

(57) ABSTRACT

A heat insulating/sound absorbing material wherein the entire surface of an inorganic fiber mat is covered with a synthetic resin film or films and a method of producing the same. Front and rear surfaces of an inorganic fiber mat 12 as well as both side surfaces along a longer side thereof are covered with synthetic resin films 13, 14; both ends of the synthetic resin films in the direction of a longer side of the inorganic fiber mat 12 are extended from both ends in the direction of a shorter side thereof to thereby cover both end surfaces in the direction of a shorter side of the inorganic fiber mat 12; an adhesive is applied continuously or discontinuously along the direction of a longer side of film to a portion in the direction of a shorter side of the inorganic fiber mat whereby the inorganic fiber mat and the synthetic resin films, and a mutually opposing portion of the synthetic resin films are bonded so as to make air communicate through unbonded portions.

4 Claims, 6 Drawing Sheets

SYNTHETIC RESIN FILM COVERED HEAT INSULATING/SOUND ABSORBING MATERIAL OF INORGANIC FIBERS AND A METHOD OF PRODUCING THE SAME

BACKGROUND OF THE INVENTION

1. Field of the Invention

The present invention relates to a synthetic resin film covered heat insulating/sound absorbing material of inorganic fibers which can eliminate a worker's discomfort due to dispersion of inorganic fibers and a method of producing the same.

2. Discussion of Background

Inorganic fiber mats made of inorganic fibers such as glass wool, rock wool or the like have widely been used as heat insulating/sound absorbing materials for buildings such as houses. The heat insulating/sound absorbing material is generally so made that front and rear surfaces of an inorganic fiber mat and both side surfaces along the direction of a longer side of the mat are covered with skin materials in order to eliminate discomfort such as an irritating feeling to a worker due to the dispersion of inorganic fibers in a construction site, and to provide the inorganic fiber mat with moisture-proofness. In a typical method of producing the heat insulating/sound absorbing materials of inorganic fibers, inorganic fiber mats are continuously delivered;

skin materials are respectively supplied to front and rear surfaces of the inorganic fiber mats; both side portions of the skin materials for covering the front and rear surfaces are jointed so that the front and rear surfaces and both side surface along the direction of a longer side of the inorganic fiber mats are covered; and the skin materials are cut off together with the inorganic fiber mats at a predetermined length.

In the heat insulating/sound absorbing material of inorganic fibers produced by the above-mentioned typical method, end surfaces of each of the inorganic fiber mats where the skin materials are cut off at a predetermined length, namely, both side surfaces along the direction of a shorter side of each of the inorganic fiber mats are not covered with the skin materials, and the end surfaces of the inorganic fiber mats are in an exposed state. Accordingly, a worker's discomfort due to the dispersion of inorganic fibers at the exposed portions was unavoidable.

Further, when the heat insulating/sound absorbing material having an exposed portion in an inorganic fiber mat was used as a heat insulating/sound absorbing material for a wall or the like in a house, moisture enters into the wall from the interior side to the exterior side and enters into the heat insulating/sound absorbing material from the exposed portion of the inorganic fiber mat. Then there is a danger of condensation when the outer temperature decreases. The condensation reduces the heat insulating performance of the mat. Further, when the condensation continues for a long term, the foundation and beams of the house will decay.

In order to solve the above-mentioned problem, Japanese unexamined publication JP-A-6-79849 discloses that an elongated inorganic fiber mat is cut off at a predetermined length and the cut inorganic fiber mats are successively delivered; thermoplastic resin sheets are supplied to front and rear surfaces of the mats; both side portions of the thermoplastic resin sheets in the direction of a longer side of the mats are melt-bonded; the thermoplastic resin sheets at the front and rear sides are melt-bonded at portions between adjacent inorganic fiber mats followed by cutting whereby the entire surface of the inorganic fiber mat is covered with the thermoplastic resin sheets, and portions of the thermoplastic resin sheets which have not been subjecting to melt-bonding are used as air communication holes.

However, the heat insulating/sound absorbing material of inorganic fibers disclosed in Japanese unexamined publication JP-A-6-79849 has problems as follows because the thermoplastic resin sheets which cover the inorganic fiber mat are mutually melt-bonded.

A thermoplastic resin sheet used generally for a skin material has a certain amount of variation in thickness at local portions. Accordingly, when a melt-bonding operation is conducted while conditions for melt-bonding such as temperature, pressure and so on are kept constant, the melt-bonding may be insufficient due to a short of heat at a portion where the thickness of the sheet is relatively large. On the other hand, the sheet is broken before melt-bonding due to over-heating and over-pressure at a portion where the thickness is relatively small. Thus, a state of melt-bonding becomes unstable. Further, when melt-bonding is conducted for the thermoplastic resin sheets at portions between adjacent inorganic fiber mats, it takes a certain time. Accordingly, the movement of the thermoplastic resin sheets is temporarily stopped with the result that scattering of a tension in the thermoplastic resin sheets is apt to take place, which may cause an unstable melt-bonding state in the same manner as above, and wrinkles may be produced in the sheets.

Thus, in an event of insufficient melt-bonding or the breakage of the sheets which results in no melt-bonding, inorganic fibers disperse from an uncovered portion whereby a worker feels stimulation.

Further, since it takes a certain time to finish the melt-bonding of the thermoplastic resin sheets, a faster feeding speed of the thermoplastic resin sheets causes difficulty in the melt-bonding. Although the feeding speed depends on the quality and the thickness of the thermoplastic resin sheets, there is possibility of causing a trouble of melt-bonding when the feeding speed exceeds 35 m/min, for instance. Accordingly, the driving speed of the production line for the heat insulating/sound absorbing material was restricted, and therefore, productivity was low.

Further, since the melt-bonding of the thermoplastic resin sheets at both end portions along the direction of a shorter side of the inorganic fiber mats was conducted in the direction perpendicular to the feeding direction of the thermoplastic resin sheets between adjacent inorganic fiber mats i.e. in the direction perpendicular to the direction of the flow of the production line of the heat insulating/sound absorbing material of inorganic fibers, a melt-bonding device had to be moved for a predetermined time in the direction of the flow of the production line of the heat insulating/sound absorbing material in order to provide a sufficient heating-pressing time for the melt-bonding. Accordingly, the melt-bonding device should be of a special construction.

SUMMARY OF THE INVENTION

It is an object of the present invention to provide a heat insulating/sound absorbing material wherein the entire surface of an inorganic fiber mat is covered with a synthetic resin film or films while communication of air is possible and a method of producing the same at a high productivity without causing a defect of bonding in the thermoplastic resin sheets.

In accordance with a first aspect of the present invention, there is provided a synthetic resin film covered heat insulating/sound absorbing material of inorganic fibers which comprises:

an inorganic fiber mat, and a single or two synthetic resin films which cover front and rear surfaces and the both side surfaces along the direction of a longer side of the inorganic fiber mat, wherein the synthetic resin film at the front side and the synthetic resin film at the rear side respectively have extensions which extend from both sides along the direction of a shorter side of the inorganic fiber mat and which are bonded with an adhesive at mutually opposing portions so that both end surfaces along a shorter side of the inorganic fiber mat are covered with the synthetic resin films, and the inorganic fiber mat is bonded to one of the synthetic resin films and the synthetic resin films are mutually bonded in the discontinuous manners in the direction of a shorter side of the inorganic fiber mat so that air communicates through unbonded portions of the synthetic resin films.

In a second aspect of the present invention, there is provided the synthetic resin film covered heat insulating/sound absorbing material according to the first aspect wherein the inorganic fiber mat is covered with two synthetic resin films of front and rear side synthetic resin films, and the two synthetic resin films respectively have opposing side portions which are bonded along a longer side of the inorganic fiber mat.

In a third aspect of the present invention, there is provided the heat insulating/sound absorbing material according to the first aspect wherein the synthetic resin films are constituted by a single film; the inorganic fiber mat is covered in a tubular form with the single film, and both side portions of the single film are mutually bonded along the direction of a longer side of the inorganic fiber mat.

In a fourth aspect, there is provided the heat insulating/sound absorbing material according to anyone of the first to the third aspects, wherein the synthetic resin film or films are bonded in a discontinuous manner along the direction of a longer side of the inorganic fiber mat so that air communicates through unbonded portions of the synthetic resin films.

In a fifth aspect, there is provided the heat insulating/sound absorbing material according to anyone of the first to the fourth aspects, wherein the synthetic resin film or films have extensions extended from both sides along a longer side of the inorganic fiber mat and extensions extended from both sides along a shorter side of the inorganic fiber mat respectively.

In a sixth aspect, there is provided the heat insulating/sound absorbing material according to anyone of the first to the fifth aspects, wherein each of the extensions of the synthetic resin films extended from both sides along the direction of a longer side of the inorganic fiber mat is 10 mm to 100 mm.

In a seventh aspect, there is provided the heat insulating/sound absorbing material according to anyone of the first to the sixth aspects, wherein each of the extensions of the synthetic resin films extended from both sides along the direction of a shorter side of the inorganic fiber mat is 10 mm to 200 mm.

In an eighth aspect, there is provided the heat insulating/sound absorbing material according to anyone of the first to the seventh aspects, wherein the adhesive is a hot-melt type adhesive.

In a ninth aspect of the present invention, there is provided a method of producing a synthetic resin film covered heat insulating/sound absorbing material of inorganic fibers which comprises:

a step of accumulating inorganic fibers during which a binder composed mainly of a thermosetting resin is applied to the inorganic fibers; curing the binder by heating to form an accumulation of inorganic fibers in a mat-like shape; cutting the mat-like accumulation of inorganic fibers to form inorganic fiber mats, and feeding the inorganic mats at a predetermined distance;

a step of supplying two synthetic resin films so as to cover the inorganic fiber mats from the sides of front and rear surfaces of the mats while an adhesive is applied continuously or discontinuously along a longitudinal direction of the synthetic resin films to a portion in the direction of the width of at least one of the two synthetic resin films;

a step of pressing continuously a portion of the inorganic fiber mats on which the synthetic fiber films are overlaid, the portion corresponding to the portion where the adhesive is applied, whereby the inorganic fiber mats and the synthetic resin films, and mutually the synthetic resin films are bonded; and a step of pressing the synthetic resin films at portions between adjacent inorganic fiber mats to bond them, and at the same time, the synthetic resin films are cut off over the entire width of the synthetic resin films.

In accordance with a tenth aspect of the present invention, there is provided a method of producing a synthetic resin film covered heat insulating/sound absorbing material of inorganic fibers which comprises:

a step of accumulating inorganic fibers during which a binder composed mainly of a thermosetting resin is applied to the inorganic fibers: curing the binder by heating to form an accumulation of inorganic fibers in mat-like shape; cutting the mat-like accumulation of inorganic fibers to form inorganic fiber mats, and feeding the inorganic mats at a predetermined distance;

a step of supplying a single synthetic resin film from the side of rear surface of the mats while an adhesive is applied continuously or discontinuously along a longitudinal direction of the synthetic resin film to a portion in a width direction of the synthetic resin film;

a step of bending the synthetic resin film in the direction of the width of fiber mats to cover the front and rear surfaces and both side surfaces along the direction of a longer side of the inorganic fiber mats;

a step of pressing continuously a portion of the inorganic fiber mats on which the synthetic resin film is overlaid, the portion corresponding to the portion where the adhesive is applied, whereby the inorganic fiber mats and the synthetic resin film, and an overlaid portion of the synthetic resin film are bonded; and a step of pressing the synthetic resin film at portions between adjacent inorganic fiber mats to bond the overlaid portion, and at the same time, the synthetic resin film is cut off over the entire width of the synthetic resin film.

The kind of the inorganic fibers used for the present invention is not in particular limited, and glass wool, rock wool or the like which is usually used as a heat insulating/sound absorbing material of inorganic fibers can be used.

Further, the kind of the inorganic fiber mat is not in particular limited, and may be of the ordinarily used heat insulating/sound absorbing material made of inorganic fibers, i.e., of such a type that inorganic fibers are accumulated while a binder composed mainly of a thermosetting resin is applied to the inorganic fibers and the binder is cured by heating to thereby form a mat-like accumulation of inorganic fibers. The density of the inorganic fiber mat can be such that it is usable as the ordinary heat insulating/sound absorbing material. For example, it is preferable for the mat to be about 5 to 100 kg/m³.

The synthetic resin film for the present invention can be for covering the ordinarily used heat insulating/sound absorbing material of inorganic fibers, e.g., a thermoplastic resin film or a laminate made of polyethylene, polyvinyl chloride, polyvinylidene chloride, polyester, polycarbonate or the like, the thermoplastic resin film or a laminate on which metallic material such as aluminum is deposited or the thermoplastic resin film or a laminate on which a different kind of synthetic resin film or an aluminum foil or the like is laminated. In particular, a high density polyethylene film is preferably used.

The thickness of the synthetic resin film is preferably in a range of 10 to 50 µm, more preferably, 15 to 30 µm. When the thickness is less than 10 µm, the tear strength is insufficient. On the other hand, when the thickness exceeds 50 µm, the weight is too large.

The synthetic resin film for covering the front surface side of the inorganic fiber mat is preferably provided with a large number of apertures having a diameter of about 1 to 5 mm so that the flow-in or the flow-out of air can be easy when the heat insulating/sound absorbing material is compressed in packaging or when a package is opened to restore the shape of the heat insulating/sound absorbing material at a working site, and moisture in the heat insulating/sound absorbing material is released with an air flow.

A single synthetic resin film or two synthetic resin films may be used as long as the entire surface of the inorganic fiber mat can be covered.

The adhesive used for the present invention can be of any type as long as the synthetic resin film or films can be bonded. As examples of the adhesive used, there are a hot-melt type adhesive such as an ethylene-vinyl acetate copolymer resin or the like, a rubber cement such as a chloroprene rubber, a styrene-butadiene rubber or the like, a water-soluble adhesive such as an acrylic resin, polyvinyl alcohol or the like and an emulsion type adhesive such as an acrylic resin, polyvinyl alcohol or the like. In particular, a sticking hot-melt type adhesive is more preferable because a time for adhering is short.

The method of applying the adhesive on the synthetic resin film is not in particular limited as long as the applying is conducted uniformly. For example, a method using spray, a method of using roll coverer can be utilized. When the adhesive is to be applied discontinuously, an air atomizing method, a spiral spray method, a wide spray method or the like is preferable. In particular, the wide spray method is more preferable since the width of applying can be kept constant. In order to apply the adhesive discontinuously, a spray device should have an electromagnetic type valve at the outlet for injecting the adhesive so that the adhesive is discharged discontinuously by controlling the opening and closing operation of the valve at predetermined intervals.

In the present invention, a single synthetic resin film or two synthetic resin films are used to cover front and rear surfaces of an inorganic fiber mat as well as both side surfaces thereof along the direction of a longer side of the mat, and at the same time, the single or two synthetic resin films have extensions extended from both sides (both end surfaces) along the direction of a shorter side of the inorganic fiber mat so as to cover the both sides (the both end surfaces) along the direction of a shorter side of the mat. After the inorganic fiber mat has been covered with the synthetic resin film or films, overlapping portions of the film or films, i.e. an edge portion or portions along the direction of a longer side of the synthetic resin film or films and edge portions along the direction of a shorter side of the film or films, are bonded, whereby the inorganic fiber mat is completely covered with the synthetic resin film or films. In this case, at least one unbonded portion should be formed in the bonded portion of the film or films so that the flow-in or flow-out of air is possible when the heat insulating/sound absorbing material is compressed at a packaging time or when the package is opened to restore the shape of the heat insulating/sound absorbing material at a working site.

The unbonded portion in the synthetic resin film or films can be formed at a position where the synthetic resin film or films are in an overlapping state along the direction of a shorter side of the inorganic fiber mat and the adhesive is discontinuously applied to the overlapping portions in the direction of the width of the synthetic resin film or films. Also, the unbonded portion can be formed at a position where the synthetic resin film or films are in an overlapping state along the direction of a longer side of the inorganic fiber mat and the adhesive is applied discontinuously to the overlapping portions along the direction of a longer side of the synthetic resin film or films.

At the same time of bonding the overlapping portions of the synthetic resin film or films, the inorganic fiber mat is partially bonded to the synthetic resin film or films with use of the adhesive so that the inorganic fiber mat is prevented from moving in the synthetic resin film or films. The position of applying the adhesive is preferably at a portion which neighbors the bonded position of the synthetic film or films along the direction of a longer side of the inorganic fiber mat or a substantially central portion in the direction of a shorter side of the inorganic fiber mat so that the front surface and/or the rear surface of the inorganic fiber mat is bonded to the synthetic resin film or films. The width of the adhesive to be applied is preferably about ⅕ to ½ of the width of the heat insulating/sound absorbing material. For example, when the heat insulating/sound absorbing material which is ordinarily used for houses, a width of about 100 mm is preferable.

A desired amount of the adhesive per unit surface area is in a range of 1 to 10 g/m², more preferably, 1 to 5 g/m².

In a preferred embodiment, when the entire surface of the inorganic fiber mat is covered with the synthetic resin film or films and the mat is bonded to the film or films and the synthetic resin films are mutually bonded with the adhesive, portions of the synthetic resin film or films are extended in an ear-like form (or a flange-like form) from both sides along the direction of a longer side and both sides along the direction of a shorter side of the inorganic fiber mat respectively. When all the extended portions are connected to posts, studs, the foundation and beams with staples, a secured fixture can be obtained in comparison with a conventional inorganic fiber mat wherein only ear portions formed at two sides are used for fixing. Further, a space surrounded by the posts, the studs, the foundation and the beams can be completely isolated by means of the synthetic resin film or films whereby the invasion of moisture into the space can effectively be prevented and condensation on the posts and so on and at the inside of the inorganic fiber mat can be prevented.

It is preferable that the length of the extensions extended from both sides along the direction of a shorter side of the inorganic fiber mat is in a range of from 10 to 200 mm, and more preferably, 70 to 170 mm. When the length of the extensions of the synthetic resin film or films is less than 10 mm, it is difficult to bond the film or films with the adhesive and to cut it or them with a pressing/cutting device during manufacture process. Further, there is difficulty in stapling in the application of the heat insulating/sound absorbing material. Further, when the length of the extensions exceeds 200 mm, it is obstructive in packaging and in the application of the heat insulating/sound absorbing material in a working site, and it is unadvantageous in an economical view since an amount of the synthetic resin film used increases.

Further, the length of the extensions of the synthetic resin film or films extended from both sides along the direction of a longer side of the inorganic fiber mat is preferably 10 to 100 mm, and more preferably, 20 to 50 mm. When the length of the extensions of the film or films is less than 10 mm, the stapling of the extensions in the application of the heat insulating/sound absorbing material is difficult. On the other hand, when the length exceeds 100 mm, it is unadvantageous in an economical view since a wider synthetic resin film is required.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
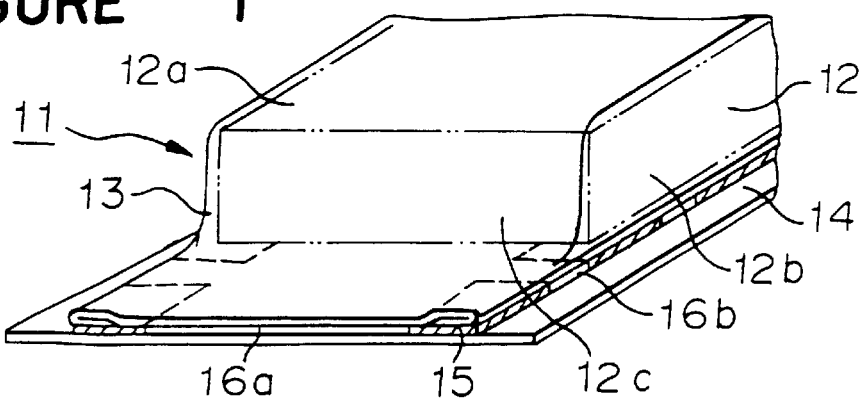
FIG. 1 is a perspective view partly omitted of an embodiment of the synthetic resin film covered heat insulating/sound absorbing material of inorganic fibers according to the present invention.

Preferred embodiments of the present invention will be described with reference to the drawings wherein the same reference numerals designate the same or the corresponding parts, therefore, description of the same or corresponding parts is omitted. In description, a way of covering an inorganic fiber mat by using a synthetic resin film, a position of an adhesive to be applied, etc. are not limited by the embodiments described below.

Figure 11:
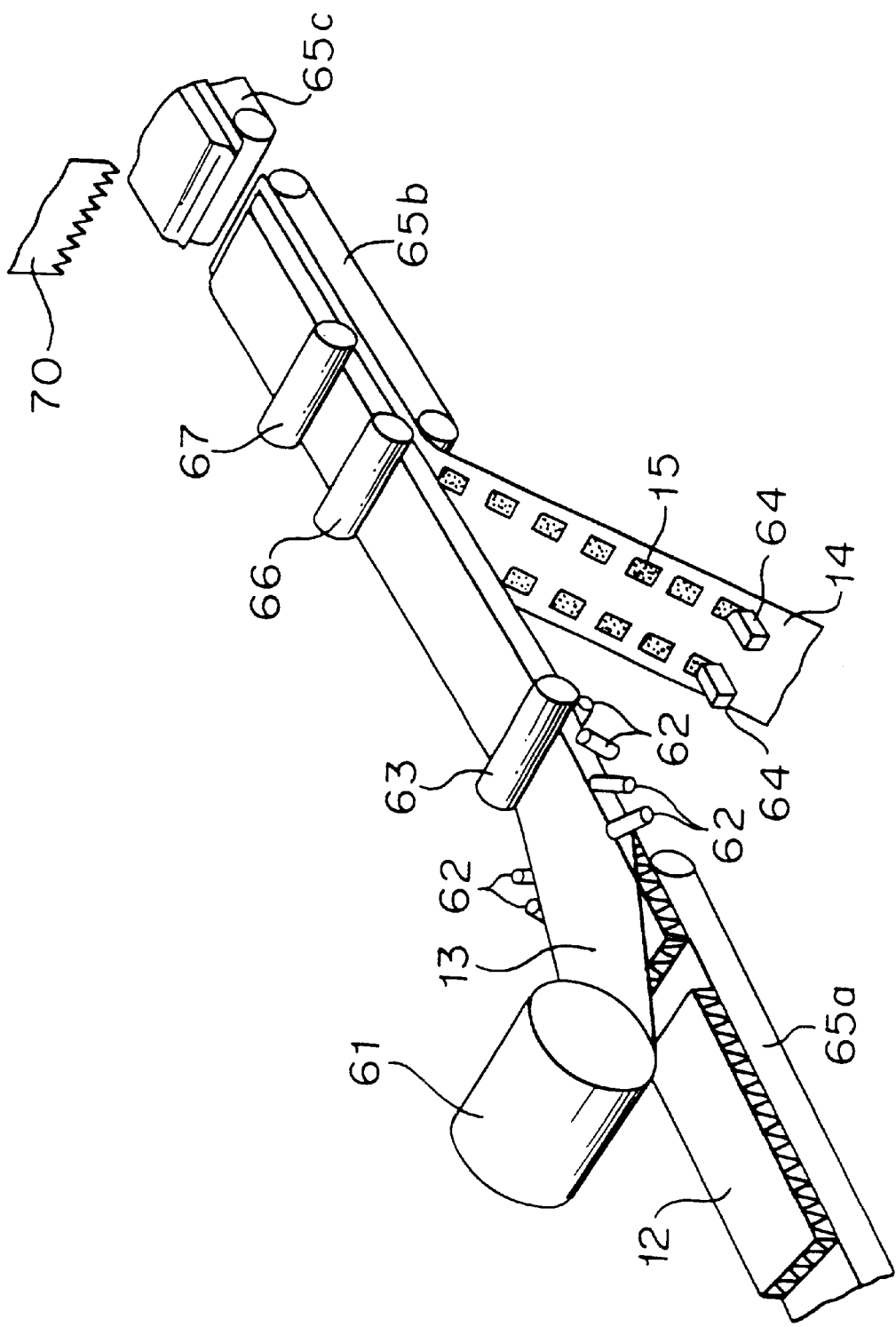
FIG. 11 is a perspective view partly omitted showing an example of an apparatus for producing the synthetic resin film covered heat insulating/sound absorbing material of inorganic fibers according to the present invention.
Figure 12:
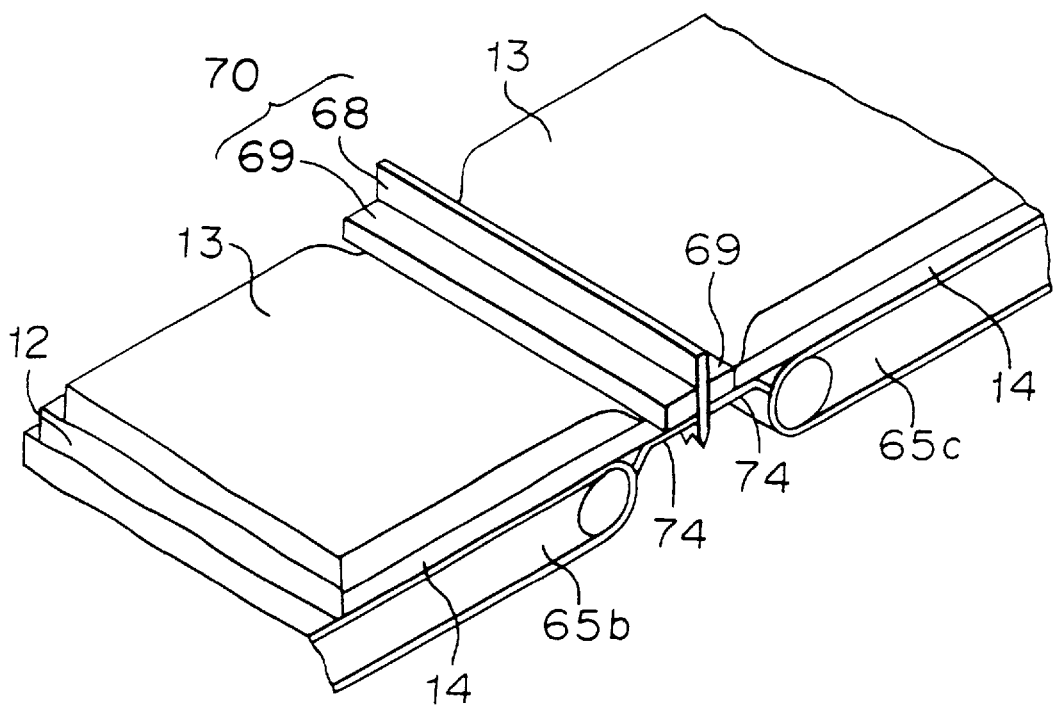
FIG. 12 is a perspective view partly omitted showing a pressing and cutting portion in the apparatus shown in FIG. 11.

FIGS. 11 and 12 show an example of an apparatus for producing the synthetic resin film covered heat insulating/sound absorbing material of inorganic fibers (hereinbelow, referred to simply as the heat insulating/sound absorbing material) of the present invention.

First, inorganic fibers are accumulated while a binder composed mainly of a thermosetting resin is applied to them; the binder is cured by heating to form an accumulation of inorganic fibers in a mat-like form; and then, the mat-like accumulation of inorganic fibers is cut off at a predetermined length to produce inorganic fiber mats 12. In a manufacturing process, the inorganic fiber mats 12 are successively put on a first conveyer 65a at predetermined intervals and transferred as shown in FIG. 11.

A second conveyer 65b is disposed in line with the first conveyer 65a at a certain distance. Between the first and second conveyers 65a, 65b, a front side synthetic resin film 13 and a rear side synthetic resin film 14, which are to cover the inorganic fiber mats 12, are supplied respectively. The front side synthetic resin film 13 is supplied in a belt-like form from an unwinding roll 61. The front side synthetic resin film 13 covers a front surface and both side surfaces along the direction of a longer side of each of the inorganic fiber mats 12 as well as both side portions, which are along the direction of a longer side of the mats 12, of a rear surface of the mats 12 by means of a plurality of rollers 62 (although only four rollers are shown in FIG. 11 for simplification, a larger number of rollers are in fact used) and a pressing roller 63.

The rear side synthetic resin film 14 is inserted between the second conveyer 65b and the inorganic fiber mats 12 to be in contact with a lower surface of the inorganic fiber mats 12 during which both side portions of the film 14 are discontinuously applied with an adhesive 15 by means of spray guns 64 each being capable of applying the adhesive at a predetermined width. The spray guns 64 are supplied with the adhesive as well as air through a supplying device (not shown). The width of the rear side synthetic resin film 14 is determined to be extended by a predetermined length from both sides along the direction of a longer side of the inorganic fiber mats 12, and the positions where the adhesive is applied are inside of the extending portions.

The inorganic fiber mats 12 having the front and rear surfaces covered with the synthetic resin films 13, 14 are transferred on the second conveyer 65b and pressed by pressing rollers 66, 67 on the conveyer 65b whereby portions of the front side synthetic resin film 13, wherein have been bent to the rear surface side, and the rear surface of the inorganic fiber mats 12 are bonded to the rear side synthetic resin film 14 by means of the adhesive 15 applied onto the rear side synthetic resin film 14.

A pressing and cutting device 70 is disposed between the second conveyer 65b and a third conveyer 65c which is disposed in line with the second conveyer 65b with a predetermined distance. The pressing and cutting device 70 comprises a cutting blade 68 disposed in perpendicular to the transfer line and a pair of pressing plates 69 disposed at both sides of the cutting blade 68 as shown in FIG. 12. The pressing and cutting device 70 is vertically movable by means of a driving unit (not shown). A pair of receiving plates 74 are disposed below the pressing and cutting device 70 so as to correspond to the pair of pressing plates 69.

When an intermediate portion between adjacent inorganic fiber mats 12 which are covered with the front and rear side synthetic resin films 13, 14, reaches below the pressing and cutting device 70, the pressing and cutting device 70 is descended by the driving unit (not shown) to cut off the synthetic resin films 13, 14 over the entire width of the films by means of the cutting blade 68, and at the same time, portions of the front and rear synthetic resin films 13, 14, which are extended from both sides at a shorter side of the inorganic fiber mat 12 (end surfaces in view of the direction of a longer side), are clamped between the pressing plates 69 and the receiving plates 74, and press-bonding is effected.

Figure 2:
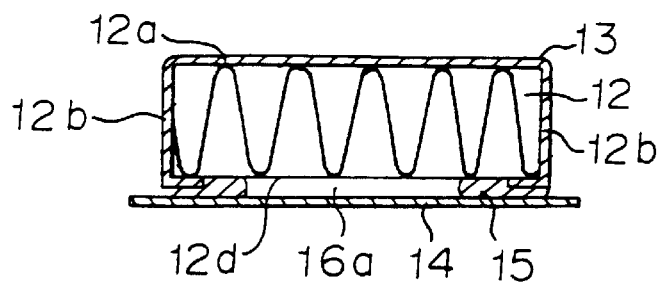
FIG. 2 is a cross-sectional view of the heat insulating/sound absorbing material of the above-mentioned embodiment.

FIGS. 1 and 2 show an embodiment of the heat insulating/sound absorbing material of the present invention thus obtained.

In a heat insulating/sound absorbing material 11, the inorganic fiber mat 12 is covered with the front side synthetic resin film 13 and the rear side synthetic resin film 14.

The front side synthetic resin film 13 has both side portions along the direction of its longer side which are turned in a channel-like shape whereby the film 13 covers the front surface 12a, both side surfaces 12b along the direction of a longer side and both side portions of the rear surface 12d except for the central portion of the rear surface 12d of the inorganic fiber mat 12. And, portions of the front side synthetic resin film 13, which are turned to a rear surface side of the inorganic fiber mat 12 and both side portions in the rear surface of the inorganic fiber mat 12, which are adjoining the turned portions are bonded to the rear side synthetic resin film 14 by means of the adhesive 15 applied onto the rear side synthetic resin film 14. In this case, since the adhesive 15 is discontinuously applied to the rear side synthetic resin film 14 along the transfer line, unbonded portions 16b are formed. And, both side portions along a longitudinal direction of the rear side synthetic resin film 14, extended from the both side surfaces 12b along the direction of a longer side of the inorganic fiber mat 12, are extended to thereby form ear portions.

Further, both side portions in a longitudinal direction of the front side synthetic resin film 13 are extended from both end surfaces 12c along the direction of a shorter side of the inorganic fiber mat 12. The extended portions are bonded with the adhesive 15 to portions of the rear side synthetic resin film 14, which are extended from the both end surfaces 12c along the direction of a shorter side of the inorganic fiber mat 12. Thus, the both end surfaces 12c along the direction of a shorter side of the inorganic fiber mat 12 are also covered with the synthetic resin films 13, 14. In this case, since adhesive 15 is applied discontinuously to both side portions of the rear side synthetic resin film 14, unbonded portions 16a are formed. Accordingly, in the inorganic fiber mat 12, the front and rear surfaces 12a, 12d, the both side surfaces 12b along the direction of a longer side of the mat and the both end surfaces 12c along the direction of a shorter side of the mat are entirely covered with the synthetic resin films 13, 14 wherein the unbonded portions 16a, 16b are formed at connecting portions of the front and rear synthetic resin films 13, 14. The unbonded portions 16a, 16b permit the flow-in and flow-out of air.

Figure 13:
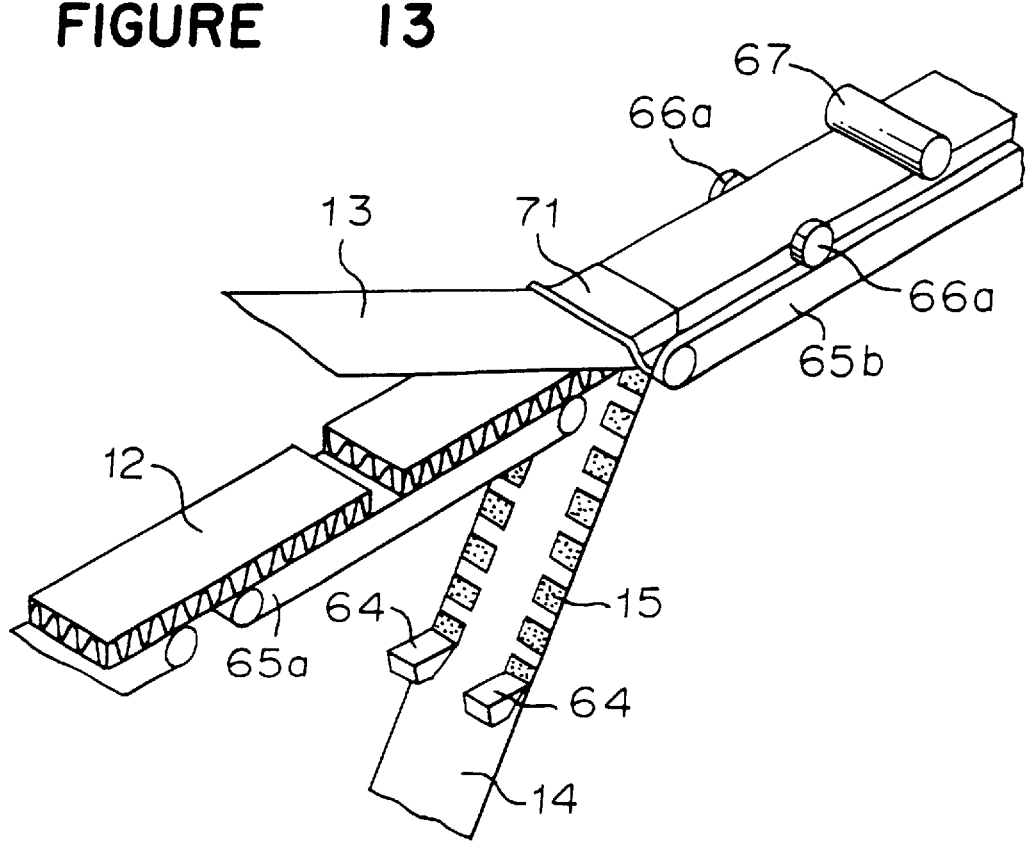
FIG. 13 is a perspective view partly omitted of another example of the apparatus for producing the synthetic resin film covered heat insulating/sound absorbing material of inorganic fibers according to the present invention.

FIG. 13 shows another example of the apparatus for producing the heat insulating/sound absorbing material of the present invention.

In this embodiment of the apparatus, the front side synthetic resin film 13 and the rear side synthetic resin film 14 are supplied between the first and second conveyers 65a, 65b to cover the front and rear surfaces of the inorganic fiber mats 12. In this case, however, the front side synthetic resin film 13 is rendered to cover the front surface of the inorganic fiber mat 12 as well as the both side surfaces along the direction of a longer side of the mat by means of a bending device 71, and further, the film 13 is bent to be extended in a flange-like form from both sides along the direction of a longer side of the inorganic fiber mat 12.

The rear side synthetic resin film 14 is discontinuously applied with the adhesive 15 to both side portions in a longitudinal direction of the film. Then, the both side portions extended in a flange-like form of the front side synthetic resin film 13 are pressed to both side portions of the rear side synthetic resin film 14 by means of a pair of pressing rollers 66a disposed at both sides of the conveyer 65b, and at the same time, the portion of the front side synthetic resin film 13, which covers the front surface of the inorganic fiber mat 12, is pressed to the inorganic fiber mat 12 by means of another pressing roller 67 which is disposed over the entire width direction of the conveyer 65b. The width of the adhesive 15 to be applied is so determined that the both side portions extended in a flange-like form of the front side synthetic resin film 13 and the both side portions at the rear surface of the inorganic fiber mat 12 can be bonded to the rear side synthetic resin film 14.

Thus, after the front side synthetic resin film 13 and the both side portions of the rear side synthetic resin film 14, and the rear side synthetic resin film 14 and the both side portions at the rear surface of the inorganic fiber mat 12 have respectively been bonded with the adhesive 15, the front side synthetic resin film 13 and the rear side synthetic resin film 14 are pressed to bond together between an intermediate portion of inorganic fiber mats 12 by means of a pressing and cutting device 70 similar to that shown in FIG. 12, and at the same time, the intermediate portion is cut off over the entire width.

Figure 3:
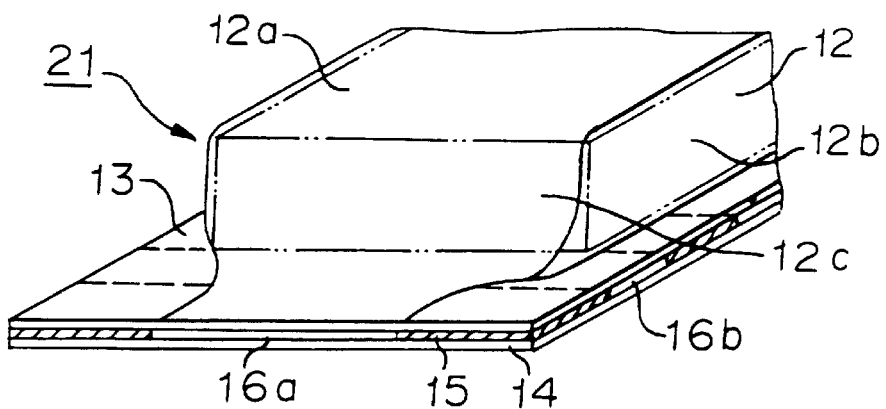
FIG. 3 is a perspective view partly omitted of a second embodiment of the synthetic resin film covered heat insulating/sound absorbing material of inorganic fibers according to the present invention.
Figure 4:
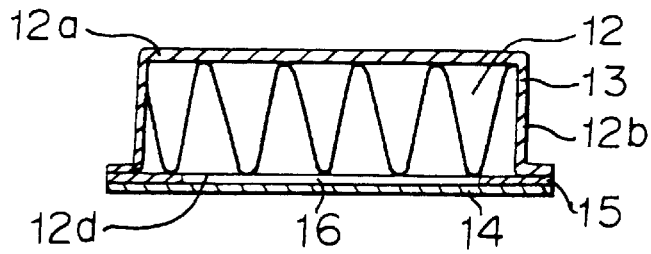
FIG. 4 is a cross-sectional view of the heat insulating/sound absorbing material of the second embodiment.

FIGS. 3 and 4 show another embodiment of the heat insulating/sound absorbing material which is produced by the apparatus shown in FIG. 13.

A heat insulating/sound absorbing material 21 comprises the inorganic fiber mat 12 covered with the front side synthetic resin film 13 and the rear side synthetic resin film 14. The front side synthetic resin film 13 covers the front surface 12a of the mat 12 and the both side surfaces 12b along the direction of a longer side of the mat 12, and further, it has extended portions in a flange-like form having a predetermined length from the both side surfaces 12b of the mat 12. Both side portions of the rear surface 12d of the inorganic fiber mat 12 and a lower surface in the portions extended in a flange-like form of the front side synthetic resin film 13 are bonded to the rear side synthetic resin film 14 by means of the adhesive 15. In this case, since the adhesive 15 is discontinuously applied to the rear side synthetic resin film 14 in a longitudinal direction of the film 14, unbonded portions 16b are formed.

Further, portions of the front side synthetic resin film 13, which are extended from the both end surfaces 12c along the direction of a shorter side of the inorganic fiber mat 12 are bonded with the adhesive 15 to portions of the rear side synthetic resin film 14, which are similarly extended from the both end surfaces 12c of the inorganic fiber mat 12. In this case, since the adhesive 15 is applied only to both side portions in a width direction of the rear side synthetic resin film 14, unbonded portions 16a are formed.

Thus, the entire surface of the inorganic fiber mat 12 is covered with the front side synthetic resin film 13 and the rear side synthetic resin film 14 providing that the unbonded portions 16a, 16b permit the flow-in and flow-out of air.

Figure 5:
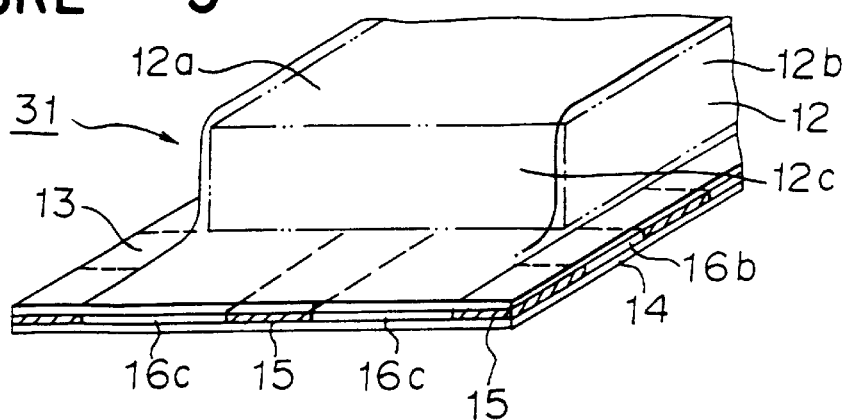
FIG. 5 is a perspective view partly omitted of a third embodiment of the synthetic resin film covered heat insulating/sound absorbing material of inorganic fibers according to the present invention.
Figure 6:
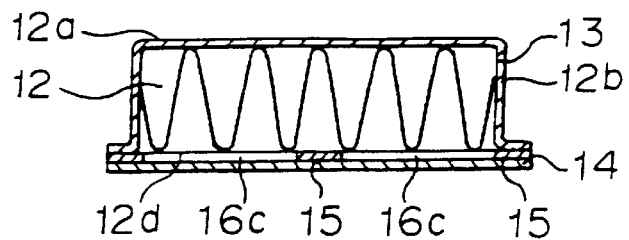
FIG. 6 is a cross-sectional view of the heat insulating/sound absorbing material of the third embodiment.

FIGS. 5 and 6 show another embodiment of the heat insulating/sound absorbing material according to the present invention. In a heat insulating/sound absorbing material 31, the inorganic fiber mat 12 is covered with the front side synthetic resin film 13 and the rear side synthetic resin film 14 in the same manner as the heat insulating/sound absorbing material 21 shown in FIGS. 3 and 4. Portions of the front side synthetic resin film 13, which are extended from the both side surfaces 12b along the direction of a longer side of the inorganic fiber mat 12, and the rear side synthetic resin film 14 are bonded discontinuously with the adhesive 15 at corresponding positions so that unbonded portions 16b are remained. The substantially central portion of the rear surface 12d of the inorganic fiber mat 12 and the rear side synthetic resin film 14 are bonded continuously at a predetermined width along the direction of a longer side of the mat 14 whereby unbonded portions 16c, 16c are formed.

The heat insulating/sound absorbing material 31 can be produced by using the apparatus shown in FIG. 13 in which the adhesive 15 is applied to three positions: both side portions and the substantially central portion of the rear side synthetic resin film 14 provided that the adhesive to be applied to the substantially central portion be continuous along the direction of the production line and the adhesive to be at the both side portions is in a discontinuous manner.

Figure 14:
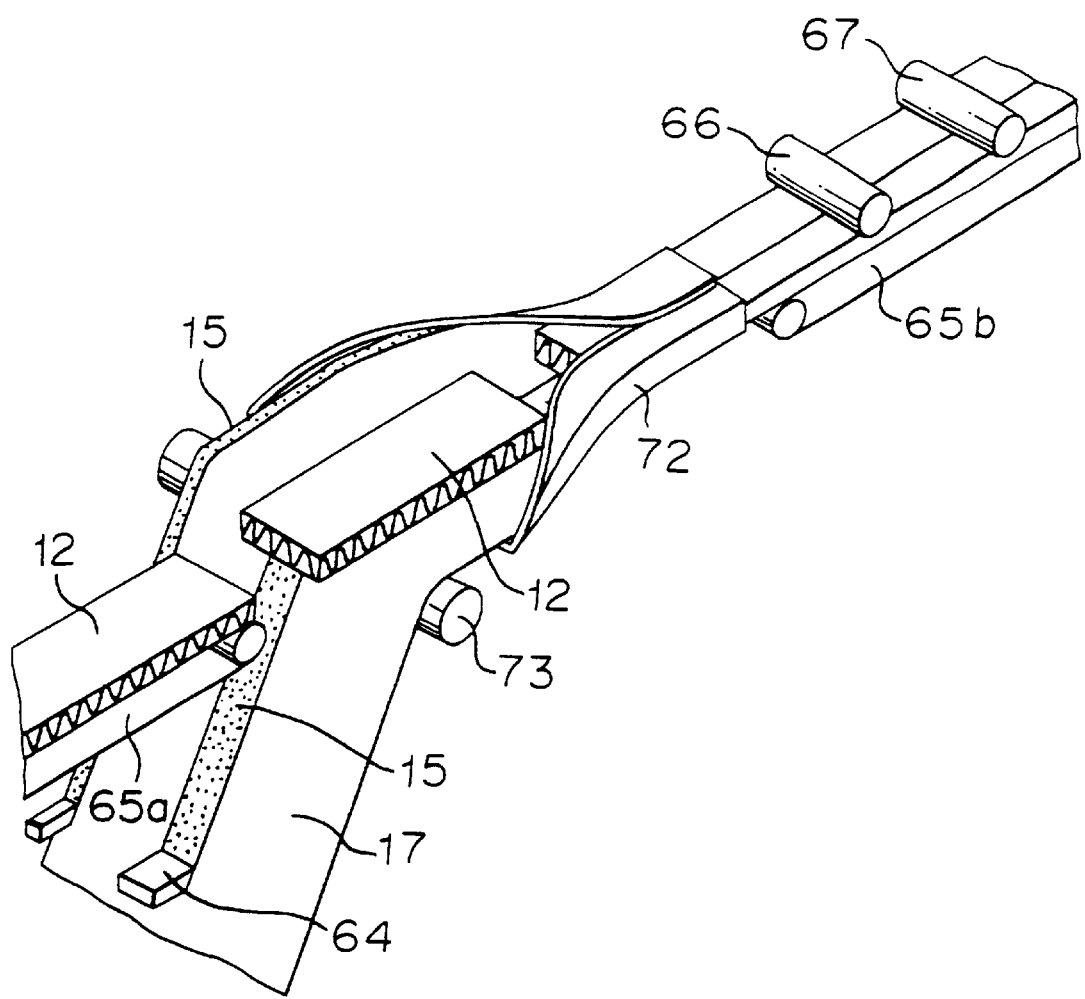
FIG. 14 is a perspective view partly omitted showing a further example of the apparatus for producing the heat insulating/sound absorbing material of inorganic fibers according to the present invention.

FIG. 14 shows another example of the apparatus for producing the heat insulating/sound absorbing material according to the present invention.

In the apparatus, a single synthetic resin film 17 is supplied from a rear surface side of the inorganic fiber mat 12 between the first and second conveyers 65a, 65b. The synthetic resin film 17 is continuously applied with the adhesive 15 at the central portion in the width direction and a side portion in the width direction of the film 17 along the production line.

The synthetic resin film 17 is passed through a wrapping device 72 in which both side portions of the film 17 are bent to cover both side surfaces along the direction of a longer side of the inorganic fiber mat 12, and further, the both side portions of the film 17 are further bent to cover an upper plane of the inorganic fiber mat 12 so that the both side portions of the film are overlapped at the upper plane of the mat 12. The wrapping device 72 has a flared inlet portion into which the synthetic resin film 17 is fed and a throat-like outlet portion the shape of which corresponds to the shape of the outer circumference of the inorganic fiber mat 12. While the inorganic fiber mat 12 covered with the synthetic resin film 17 is transferred on the second conveyer 65b, the mat 12 is pressed by pressing rollers 66, 67 whereby the both side portions in an overlapping state of the synthetic resin film 17, and the central portion at a lower surface of the inorganic fiber mat 12 and the synthetic film 17 are respectively bonded with the adhesive 15.

Then, extended portions of the synthetic resin film 17 which are between adjacent inorganic fiber mats 12 and which are extended from both end portions along the direction of a shorter side of the inorganic fiber mat 12 are pressed vertically to be bonded, and at the same time, the extended portions are cut off over the entire width of the film.

Figure 7:
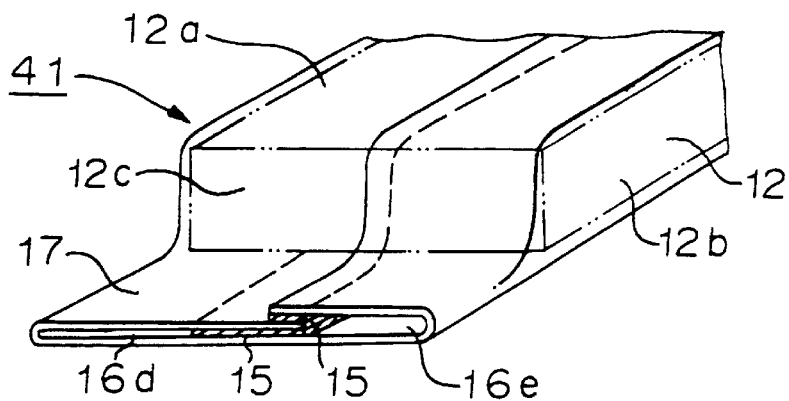
FIG. 7 is a perspective view partly omitted of a fourth embodiment of the synthetic resin film covered heat insulating/sound absorbing material of inorganic fibers according to the present invention.
Figure 8:
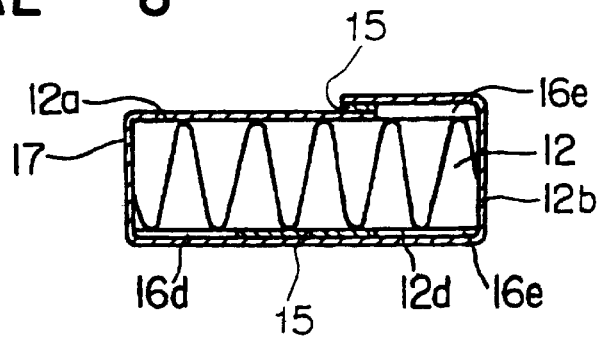
FIG. 8 is a cross-sectional view of the heat insulating/sound absorbing material of the fourth embodiment.

FIGS. 7 and 8 show another embodiment of the heat insulating/sound absorbing material thus obtained.

In a heat insulating/sound absorbing material 41, the front surface 12a, the rear surface 12d and the both side surfaces 12b along the direction of a longer side of the inorganic fiber mat 12 are covered by a single synthetic resin film 17 so as to be wrapped in a tubular form, and both side portions along a longitudinal direction of the synthetic resin film 17 are overlapped on the front surface 12a at the substantially central portion in the direction of a shorter side of the inorganic fiber mat 12. The overlapped portions are bonded together with the adhesive 15 which is applied to one of side portions of the synthetic resin film 17.

Extended portions in the longitudinal direction of the synthetic resin film 17 are extended from both end surfaces 12c along the direction of a shorter side of the inorganic fiber mat 12, and the extended portions are pressed in a flat form in the direction of the rear surface 12d of the inorganic fiber mat 12, and the extended portions are bonded with the adhesive 15 which is applied to the substantially central portion in the width direction of the synthetic resin film 17. Further, the central portion of the rear surface 12d of the inorganic fiber mat 12 is bonded to the synthetic resin film 17 by means of the adhesive 15. Unbonded portions 16d, 16e are formed at both end portions in the longitudinal direction of the synthetic resin film 17 so that the flow-in and flow-out-of air is possible.

Figure 9:
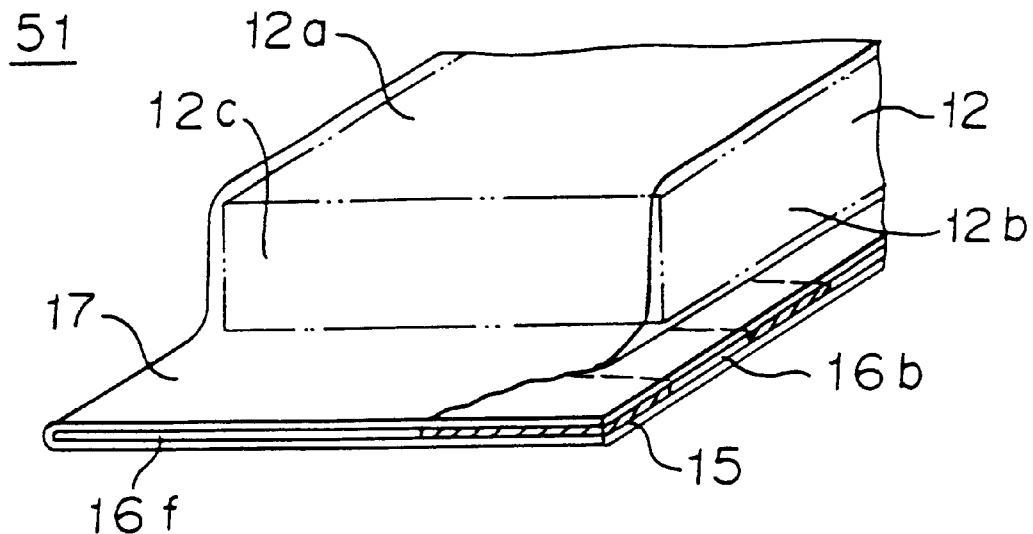
FIG. 9 is a perspective view partly omitted of a fifth embodiment of the synthetic resin film covered heat insulating/sound absorbing material of inorganic fibers according to the present invention.
Figure 10:
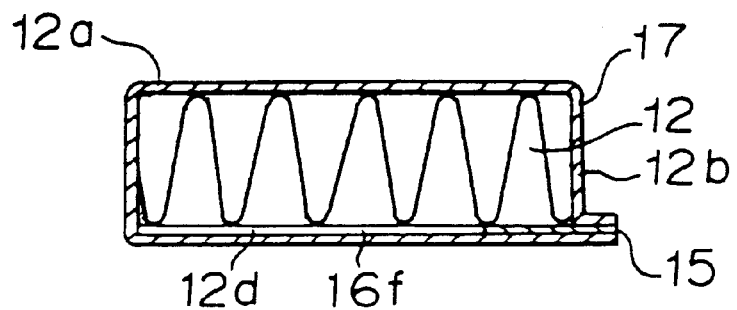
FIG. 10 is a cross-sectional view of the heat insulating/sound absorbing material of the fifth embodiment.

FIGS. 9 and 10 show another embodiment of the heat insulating/sound absorbing material of the present invention.

In a heat insulating/sound absorbing material 51 according to this embodiment, the inorganic fiber mat 12 is covered with a single synthetic resin film 17 in a tubular form wherein both side portions along a longitudinal direction of the synthetic resin film 17 are extended in an overlapping state from one side of the side surfaces 12b along the direction of a longer side of the inorganic fiber mat 12; the overlapping portions are discontinuously bonded with the adhesive 15 along the longitudinal direction of the film so that unbonded portions 16b are formed between discontinuously bonded portions.

The width of the adhesive 15 on the synthetic resin film 17 is determined to cover one of side portions of the rear surface 12d of the inorganic fiber mat 12 whereby the side portion of the rear surface 12d of the mat 12 is also bonded to the synthetic resin film 17.

Further, end portions in the longitudinal direction of the synthetic resin film 17 are extended from both end surfaces 12c along the direction of a shorter side of the inorganic fiber mat 12, and the extended portions are pressed in a flat form in the direction of the rear surface 12d of the mat 12 and bonded by the adhesive 15. Unbonded portions 16f are formed at both end portions in the longitudinal direction of the synthetic resin film 17 so that the flow-in and flow-out of air is permitted in the same manner as the unbonded portions 16b formed along the longitudinal direction of the film 17.

Now, the present invention will be described in detail with reference to examples. However, it should be understood that the present invention is by no means restricted by such specific examples.

Example

The heat insulating/sound absorbing materials of the present invention were prepared by using the apparatus shown in FIGS. 11 and 12.

For inorganic fiber mats 12, a glass wool mat having a density of 10 kg/m³, a width of 430 mm, a length of 1370 mm and a thickness of 50 mm was used.

For the front side synthetic resin film 13, a high density polyethylene film having a width of 660 mm and a thickness of 20 μm was used. Both side portions along a longitudinal direction of the front side synthetic resin film 13 were bent by means of the wrapping rollers 62 to cover the front surface of the inorganic fiber mats 12, the both side surfaces along the direction of a longer side of the mats and the both side portions of the rear surface of the mats. The width of both side portions along the longitudinal direction of the front side synthetic resin film 13, which are turned to a rear surface side of the inorganic fiber mats 12, was 65 mm.

For the rear side synthetic resin film 14, a high density polyethylene film having a width of 490 mm and a thickness of 20 μm was used. To portions of the rear side synthetic resin film 14, which were inside by 30 mm from both side edges along the longitudinal direction of the film, a hot-melt type adhesive was applied discontinuously in the longitudinal direction at a spread quantity per unit surface area of 1 g/m² and with a width of 150 mm with use of a wide spray. The rear side synthetic resin film 14 was brought to contact with the rear surface of the inorganic fiber mats 12 covered with the front side synthetic resin film 13, and then, the rear side synthetic resin film 14 was pressed on the second conveyer 65b by means of the pressing rollers 66, 67. The pressing and cutting device 70 shown in FIG. 12 was applied to the front side synthetic resin film 13 and the rear side synthetic resin film 14 between adjacent inorganic fiber mats 12 to bond them by pressing, and at the same time, an intermediate portion of each of the bonded portions was cut off over the entire width. Thus, heat insulating/sound absorbing materials 11 as shown in FIGS. 1 and 2 were obtained.

In each of the heat insulating/sound absorbing materials, both side edges along the longitudinal direction of the rear side synthetic resin film 14 were extended from both side surfaces 12b along the direction of a longer side of each of the inorganic fiber mats 12 to form ear portions having a width of 30 mm. The adhesive 15 was applied to the inside of the ear portions to have a width of 150 mm whereby the both side portions of the front side synthetic resin film 13 and the both side portions of the inorganic fiber mat 12 were bonded to the rear side synthetic resin film 14. Both end portions in the longitudinal direction of the front and rear synthetic resin films 13, 14, i.e., portions extended from both end surfaces 12c along the direction of a shorter side of the inorganic fiber mat 12 have respectively a length of extension of 125 mm, which are bonded by pressing them in a flat form. However, an unbonded portion 16a having a width of 130 mm is formed at the central portion of each of the extended portions. Further, unbonded portions 16b are formed in both side portions along the longitudinal direction of the front and rear synthetic resin films 13, 14.

The speed of the manufacture line for the heat insulating/sound absorbing materials was 60 m/min, and there was no problem such as a failure of bonding of the synthetic resin films. Further, air communication was excellent at the time of the compression of the heat insulating/sound absorbing material when it is packaged and the recovery of the material in a working site. Further, the compression and the recovery were easily done.

According to the heat insulating/sound absorbing material in the first aspect of the present invention, the front and rear surfaces and the both side surfaces along the direction of a longer side of the inorganic fiber mat are covered with the synthetic resin film or films, and the front side synthetic resin film and the rear side synthetic resin film are respectively have extended portions from both end surfaces along the direction of a shorter side of the inorganic fiber mat so that the both end surfaces along the direction of a shorter side of the inorganic fiber mat are also covered with the synthetic resin films, whereby the entire surface of the inorganic fiber mat is covered with the synthetic resin films. Accordingly, there is no possibility of the direct contact of inorganic fibers to a worker's skin when the heat insulating/sound material is handled. Further, a possibility of scattering of the inorganic fibers to make the worker discomfort can largely be reduced. Further, in the application of the heat insulating/sound absorbing material to walls of a house, even when moisture in a room escapes the interior side to enter into the walls, there is no possibility of the moisture entering into the heat insulating/sound absorbing material. Accordingly, there is no condensation inside the material, and the reduction of the heat insulating property, and deterioration of the base and beams can be prevented.

Further, the inorganic fiber mat is bonded to the synthetic resin film in a discontinuous manner, and the synthetic resin films are mutually bonded in a discontinuous manner, in the direction of a shorter side of the inorganic fiber mat so that air communication is obtainable at unbonded portions between the synthetic resin films. Accordingly, the inorganic fiber mat is immovable in the synthetic resin films, and the flow-in and flow-out of air necessary for compression at the time of packaging and the recovery in a working site are sufficiently obtainable.

According to the second aspect of the present invention, the inorganic fiber mat is covered with two synthetic resin films of front and rear side, and both sides of the two synthetic resin films are respectively bonded along the direction of a longer side of the inorganic fiber mat. Accordingly, the synthetic resin films can easily be extended from both side surfaces along the direction of a longer side of the inorganic fiber mat.

According to the third aspect of the invention, the inorganic fiber mat is covered with a single synthetic resin film whereby the structure of a synthetic resin film supplying device can be simplified, and a variety of shapes of products can be obtained.

In the fourth aspect of the invention, since the synthetic resin film or films are bonded discontinuously along the direction of a longer side of the inorganic fiber mat, and air communicates through unbonded portions of the synthetic resin film or films, the flow-in and flow-out of air necessary for the compression at the time of packaging and the recovery in a working site are sufficient.

In the fifth aspect of the invention, the synthetic resin films are extended from all the four side portions of the inorganic fiber mat, i.e., both side surfaces along the direction of a longer side and both end surfaces along the direction of a shorter side of the inorganic fiber mat. Accordingly, in the application of the heat insulating/sound absorbing material to walls or the like in houses, the extended portions can be connected to studs, the foundation and beams by means of staples. Accordingly, a secure fixing can be obtained in comparison with the conventional heat insulating/sound absorbing material having ear portions formed at two side portions. Further, when the extensions of the synthetic resin films extended from the four side portions of the inorganic fiber mat are stapled, the space surrounded by posts, the foundation and beams can be covered with the synthetic resin films. Accordingly, the invasion of moisture to the space can effectively be prevented as well as the prevention of condensation on the posts and so on and the inside of the inorganic fiber mat. According to the sixth aspect of the invention, the length of the synthetic resin films extended from both side surfaces along the direction of a longer side of the inorganic fiber mat is 10 to 100 mm. Accordingly, a stapling operation is easy in the application of the heat insulating/sound absorbing material, and it is advantageous in an economical view.

In the seventh aspect of the invention, the length of the synthetic resin film extended from both end surfaces along the direction of a shorter side of the inorganic fiber mat is 10 to 200 mm. Accordingly, it is easy to bond and cut the extended portions by means of the pressing and cutting device in manufacturing process. Further, the stapling operation is easy in the application of the heat insulating/sound absorbing material, and the extended portions are not obstructive in the packaging and the application, and it is advantageous in economical view.

In the eighth aspect of the invention, a hot-melt type adhesive is used as the adhesive. Accordingly, the inorganic fiber mat and the synthetic resin film or the synthetic resin films can easily be bonded in a short time.

According to the ninth or the tenth aspect of the invention, the inorganic fiber mat is bonded to the synthetic resin films and the synthetic resin films are mutually bonded by using an adhesive. Accordingly, when a suitable kind of the adhesive can be selected, a time for bonding can be shortened in comparison with a case that the bonding is effected by melt-bonding. As a result, the speed of the manufacture line can be about 60 to 100 m/min. Further, since the bonding and cutting of the synthetic resin films in the direction perpendicular to the flow of the manufacture line, i.e., the bonding and cutting at end portions along the direction of a shorter side of the inorganic fiber mat can be effected in a short time of 0.1 sec or less, a special device of bonding and cutting wherein it can follow for a predetermined time in the flow direction of the manufacture line is unnecessary. Accordingly, the heat insulating/sound absorbing material can be produced with high productivity without a failure of bonding of the synthetic resin films.

Obviously, numerous modifications and variations of the present invention are possible in light of the above teachings. It is therefore to be understood that within the scope of the appended claims, the invention may be practiced otherwise than as specifically described herein.

What is claimed is:

1. A synthetic resin film covered heat insulating/sound absorbing material of inorganic fibers which comprises:

an inorganic fiber mat, having longer and shorter sides and two synthetic resin films which cover front and rear surfaces and both side surfaces along the direction of the longer side of the inorganic fiber mat, wherein the synthetic resin film at the front side and the synthetic resin film at the rear side, along the direction of the longer side of the mat, respectively have extensions which extend by 10 mm to 200 mm from both sides along the direction of the shorter side of the inorganic fiber mat, transverse to the direction of the longer side of the mat, and which are bonded with a hot melt adhesive at mutually opposing portions so that both end surfaces along the shorter side of the inorganic fiber mat are covered with the synthetic resin films, and the inorganic fiber mat is bonded to one of the synthetic resin films and the synthetic resin films are mutually bonded in a discontinuous manner in the direction of the shorter side of the inorganic fiber mat so that air communicates through unbonded portions of the synthetic resin films, and further extensions extending from both sides along the direction of the longer sides of the inorganic fiber mat.

2. The heat insulating/sound absorbing material according to claim 1, wherein the synthetic resin films are bonded in a discontinuous manner along the direction of a longer side of the inorganic fiber mat so that air communicates through unbonded portions of the synthetic resin films.

3. The heat insulating/sound absorbing material according to claim 1, wherein each of the extensions of the synthetic resin films extended from both sides along the direction of the longer side of the inorganic fiber mat is 10 mm to 100 mm.

4. The synthetic resin film covered heat insulating/sound absorbing material of claim 1, wherein said hot melt adhesive is a sticking hot melt adhesive.

\* \* \* \* \*

UNITED STATES PATENT AND TRADEMARK OFFICE
CERTIFICATE OF CORRECTION

PATENT NO.     : 6,534,144 B1                                                Page 1 of 1
DATED          : March 18, 2003
INVENTOR(S)    : Bando et al.

It is certified that error appears in the above-identified patent and that said Letters Patent is hereby corrected as shown below:

<u>Title page,</u>
Items [45] and [*] Notice, should read as follows:
-- [45]  **Date of Patent:   *Mar. 18, 2003**
   [*]   Notice: This patent issued on a continued prosecution
                 application filed under 37 CFR 1.53(d), and is
                 subject to the twenty year patent term provisions
                 of 35 U.S.C. 154(a)(2).

Subject to any disclaimer, the term of this
         patent is extended or adjusted under 35
         U.S.C. 154(b) by 600 days. --

Signed and Sealed this

Twenty-ninth Day of July, 2003

JAMES E. ROGAN
*Director of the United States Patent and Trademark Office*